United States Patent [19]

Flaskett

[11] 4,270,964
[45] Jun. 2, 1981

[54] METHOD AND APPARATUS FOR REINFORCING A LAYER OF PLASTICS MATERIAL

[75] Inventor: Peter J. Flaskett, Whitley Bay, England

[73] Assignee: Rohm and Haas Company, Philadelphia, Pa.

[21] Appl. No.: 23,375

[22] Filed: Mar. 23, 1979

[30] Foreign Application Priority Data

Mar. 29, 1978 [GB] United Kingdom ............... 12226/78

[51] Int. Cl.³ .................. B29C 17/00; B32B 31/00
[52] U.S. Cl. .................. 156/228; 156/245; 156/286; 156/500; 156/583.3; 264/102; 264/112; 264/263; 264/316; 264/510; 264/571; 425/420

[58] Field of Search ............... 264/313, 316, 314, 257, 264/258, 259, 263, 101, 102, 571, 531, 510, 553, 554, 109, 112, 136, 137; 156/62.2, 228, 224, 214, 242, 245, 381, 382, 500, 285, 286, 267, 497, 583.3; 425/DIG. 60, 405 R, 420, 416; 428/286, 287

[56] References Cited

U.S. PATENT DOCUMENTS

| | | | |
|---|---|---|---|
| 2,815,309 | 12/1957 | DeGanahl et al. | 156/214 |
| 3,210,230 | 10/1965 | Tyhurst | 156/228 |
| 3,423,267 | 1/1969 | Munk | 156/228 |
| 3,666,600 | 5/1972 | Yoshino | 156/285 |
| 3,684,645 | 8/1972 | Temple et al. | 161/141 |
| 3,970,732 | 7/1976 | Slaats et al. | 264/101 |

Primary Examiner—Michael W. Ball
Attorney, Agent, or Firm—Michael B. Fein

[57] ABSTRACT

Disclosed herein is a new method and new apparatus for applying fibrous reinforcements to a thermoformed plastic sheet comprising a base bearing, an upper support having a gutter, a plastic membrane, and a seal bounding the gutter so that when air is drawn from the outlet and at least partial vacuum is formed between the membrane and the surface.

15 Claims, 3 Drawing Figures

METHOD AND APPARATUS FOR REINFORCING A LAYER OF PLASTICS MATERIAL

This invention is concerned with apparatus and method for reinforcing a layer of plastics material and articles made thereby. More particularly this invention is concerned with apparatus and method for reinforcing thermoplastic sheet.

Various cold moulding processes are known, that is processes in which the mould parts are not heated during operation. Many of these processes are described in the "SPI Handbook of Technology and Engineering of Reinforced Plastics/Composites", 2nd Ed. Van Nostrand Rheinold Company, N.Y. 1973. These processes vary in complexity from simple hand lay-up and spray-up methods to techniques which require more sophisticated moulding methods and apparatus such as the Marco method, vacuum bag moulding, cold press moulding, resin injection moulding and vacuum injection moulding.

Lay-up and spray-up techniques are relatively simple in that much of the work is done by hand and the equipment is inexpensive and uncomplicated. A single mould is used to shape the part and one side of the laminate is open to atmosphere. However, the quality of the products is often poor in one or more respects and is dependent upon the skill of the operator. These methods are, in general, also time-consuming and labour intensive. In comparison, other of the methods mentioned above are less dependent on the skill of the operator and lend themselves to volume production. They use pressure to distribute the resin and compact the laminate and usually require matched moulds so that a cavity defines the outer dimensions of the part. However, these also suffer from disadvantages in that bulky and often expensive equipment is required. Vacuum bag moulding is an intermediate process in these respects which uses a plastics membrane to compact the laminate by the use of atmospheric pressure applied through the membrane by drawing air out of the space between the mould and membrane. The process has advantages which include visual monitoring through the membrane of complete saturation of the fibre reinforcement by the resin and equipment which is not bulky, but the membrane, or bag, has to be hand-sealed with a sticky sealant to the edges of the mould. This is not only time consuming but it is difficult or even impossible to remove all the folds from the membrane with the result that it can only be used once, due to the deposition of cured resin in the folds, and the finished product requires sanding to remove ridges left by the folds in the membrane.

We have now found an apparatus which may alleviate these difficulties while retaining the advantages of inexpensive and simple equipment, minimised requirement for skilled personnel, volume production and good properties in the moulded part.

According to the invention there is provided an apparatus wherein fibrous reinforcement may be applied to a layer of plastics material and bonded thereto by the polymerization of resin distributed through the reinforcement, which apparatus comprises:

(i) a base bearing (ii) an upper support having a flat or dished surface bounded at least in part by gutter having at least one channel communicating with at least one outlet, the support accepting in use the layer of plastics material which has a shape corresponding to the surface and gutter, the gutter in the plastics material being for receiving any resin surplus to that required to impregnate the fibrous reinforcement, (iii) at least one plastics membrane correspondingly shaped to the surface and which, when laid over the upper support, will overlap, (iv) at least one seal bounding the gutter and outlet of the support so that when air is drawn from the outlet an at least partial vacuum is formed between the membrane and the surface.

The invention also provides a method of reinforcing a layer of plastics material by means of an apparatus comprising a base with an upper support thereon, which support has a flat or dished surface bounded at least in part by gutter having at least one channel communicating with at least one outlet and at least one seal bounding said gutter and outlet, the plastics material being correspondingly shaped to said surface and gutter, the method comprising the steps of:

(a) applying the layer of plastics material to the support, (b) applying at least one layer of fibrous reinforcement to at least the flat or dished area of the plastics material, (c) applying a polymerizable resin to the fibrous reinforcement, (d) laying at least one plastics membrane, correspondingly shaped to the surface, over the support so as to overlap the seal, (e) drawing air from the outlet so as to form an at least partial vacuum between the membrane and the surface and to impregnate the reinforcement with the resin, and (f) polymerizing the resin, or allowing it to polymerize, any resin surplus to that required to impregnate the fibrous reinforcement being received by the gutter in the plastics material.

Some preferred embodiments of the invention will now be more particularly described in and by the accompanying drawings, in which.

Figure 1:
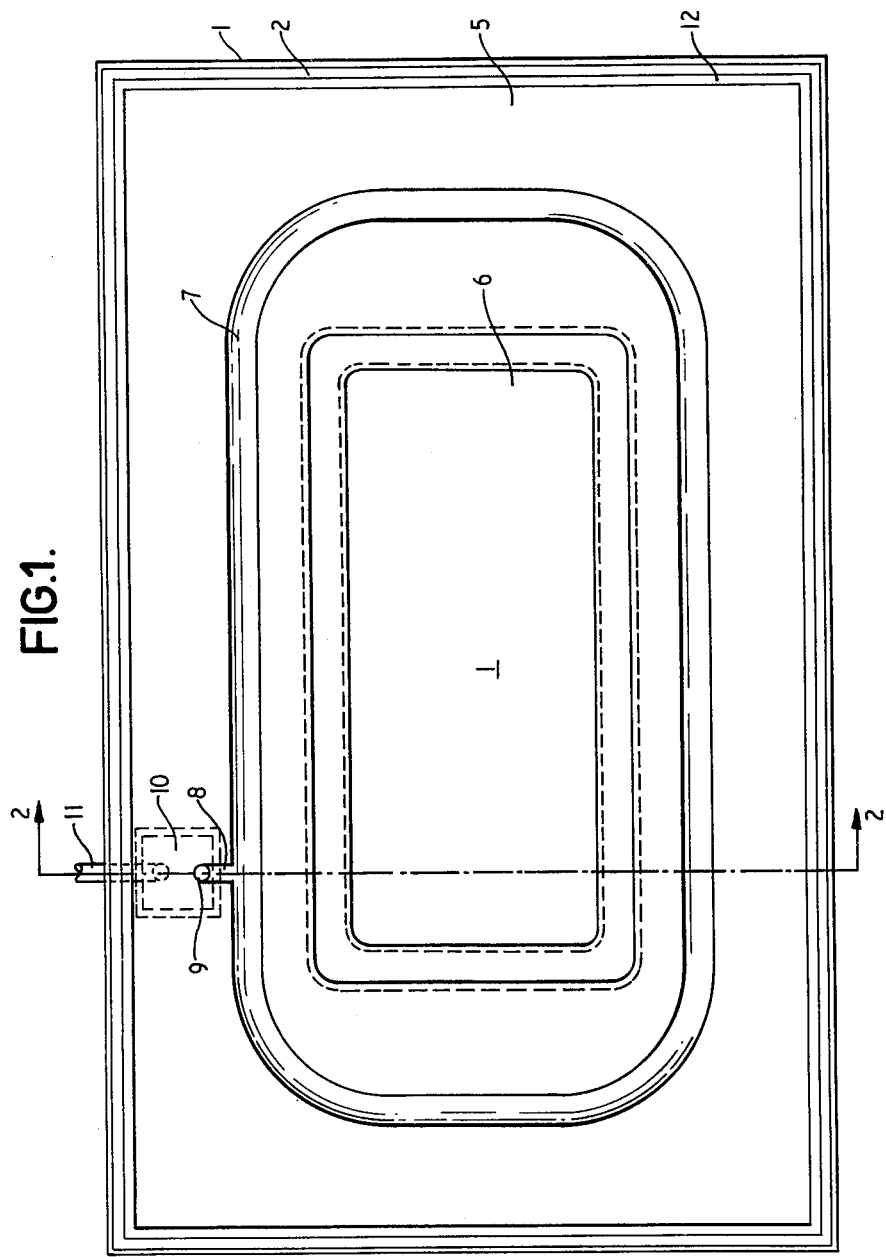
FIG. 1 is a view of an apparatus of the invention from above.
Figure 2:
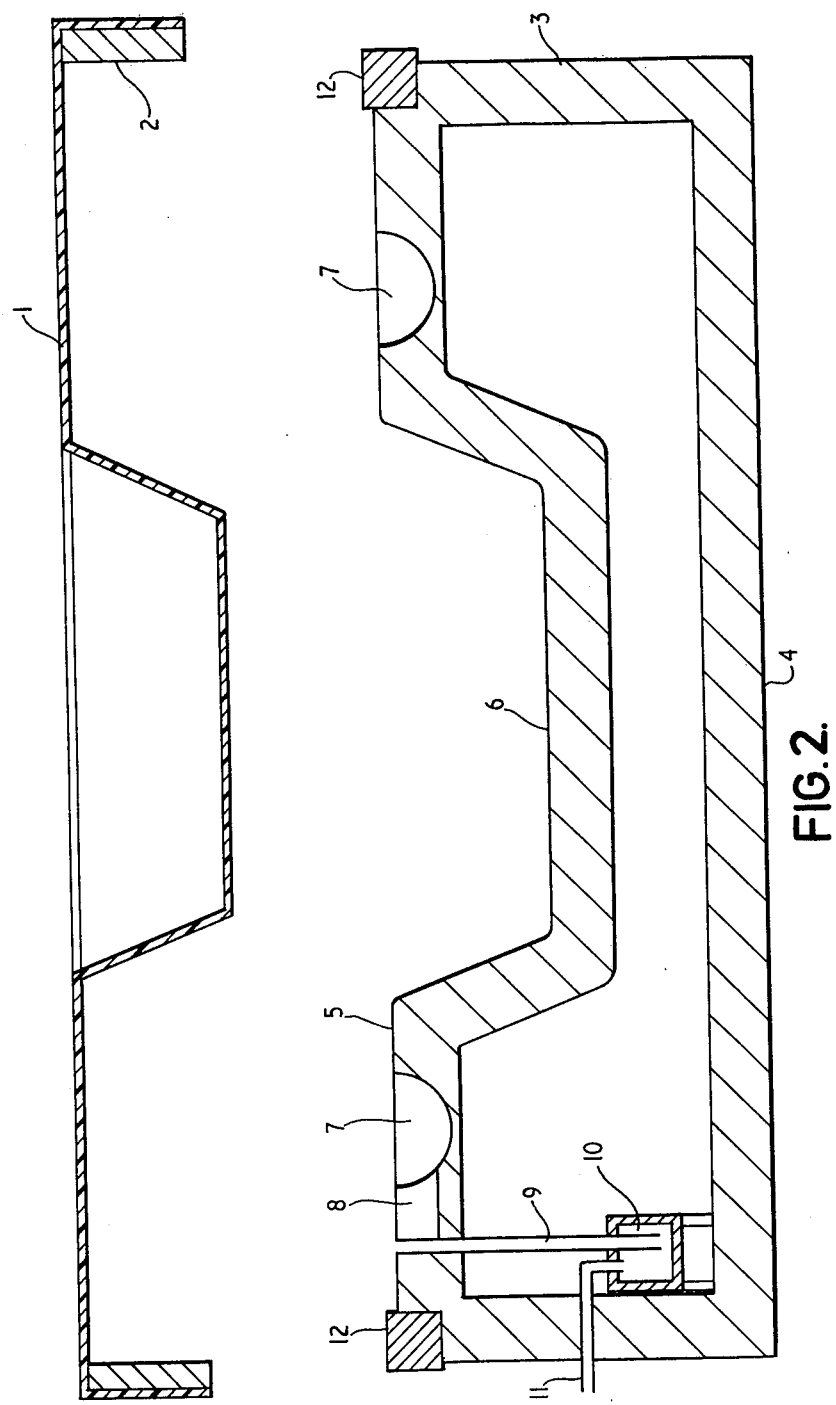
FIG. 2 is a cross-sectional and exploded view of the apparatus taken along line 2—2 in FIG. 1.
Figure 3:
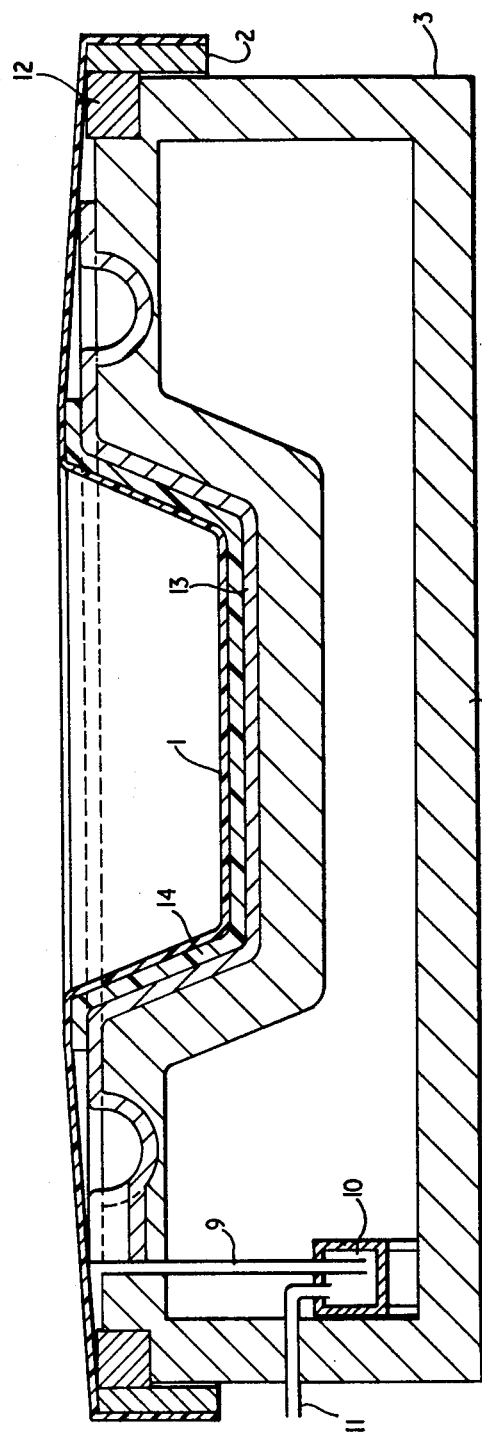
FIG. 3 is a similar cross-sectional view to FIG. 2, but with the apparatus assembled and greater detail shown.

In FIG. 1, a preshaped membrane 1 made of transparent plastics material is attached to a frame 2 which will slideably engage the walls 3 of the base 4 of the apparatus, as shown in FIG. 3. As can be seen most clearly in FIG. 2, an upper support 5 on the base has a dished surface 6. The membrane has a corresponding dish shape. The surface 6 is bounded by a gutter 7 which has a channel 8 communicating with an outlet 9. This outlet passes into a resin trap 10 provided with a further outlet 11 passing through a wall of the base for connection to a vacuum pump. On the peripheral edge of the support there is a rubbery seal 12, which will make contact with the membrane and its frame when they are laid over the support as shown in FIG. 3.

In use, a layer of plastics material, preferably a preformed plastics sheet, is applied to the surface. Referring to FIG. 3, the sheet 13 is correspondingly shaped to the dished surface, gutter and channel of the support. On the plastics sheet the gutter and channel are located in a flash area which will be subsequently trimmed from the finished product. The channel in the plastics sheet extends down at least a part of the channel in the surface. In the figure the two channels are shown as having an equal length. The channels may be located either in a central or offset position with respect to a length of one side of the apparatus. A layer of fibrous reinforcement, preferably a glass fibre layer 14, is applied to the dished area of the plastics material and overlaps that area slightly, but not as far as the gutter, as shown in FIG. 3. A liquid, polymerizable resin, preferably containing a polymerization catalyst, is then applied to the glass fibre in an amount at least sufficient to saturate the fibre. The preshaped membrane in its frame is then lowered over the apparatus and air is drawn through outlet 9 from between the membrane and the plastics sheet by means of a vacuum pump (not shown) connected to outlet 11. As air is withdrawn the liquid resin is caused to flow and impregnate the glass fibre as atmospheric pressure is brought to bear on the membrane, thereby forcing the membrane downwards to compact the fibrous reinforcement and aid its impregnation by the resin. Any surplus resin seeps into the surrounding gutter in the plastics sheet where it can set and be conveniently and cleanly disposed of when the gutter is trimmed from the reinforced product. The resin may be allowed to polymerize by the action of a catalyst, and/or the polymerization may be accelerated by the application of heat, such as by positioning a heater above the apparatus. Since the membrane is usually transparent, the operator can monitor the progress of the polymerization and, in particular, ensure that the reinforcement is uniformly and completely impregnated by the resin.

When polymerization is complete air is allowed to return between the membrane and surface and the frame and membrane are removed. The reinforced sheet is also removed from the support and the gutter area is trimmed as mentioned above.

While this invention embraces the production of both flat and shaped articles, i.e. where the surface and correspondingly the membrane is flat or dished, it is preferred that dished shapes are used. The flexibility of the membrane makes the apparatus particularly useful for reinforcing these shapes and even complex and sharply cornered ones such as undercuts. In the latter case it would be necessary for the support to have movable parts so that the undercut plastic layer could be held in place. This technique is known in the art. The membrane may be preshaped into any desired configuration by conventional thermoforming or vacuum forming techniques. For example, the membrane may be shaped by heating it, such as by infra-red heat, and then quickly lowered over a suitably shaped surface so that it is sealed around the surface. Air is then removed from between the membrane and surface so that the membrane is drawn and shaped to the contour of the surface.

The membrane is most desirably transparent, for the reasons mentioned above. The material should be thermoformable, tough (so that it will not tear or puncture during handling), resistant to attack by the resin and self-releasing from the cured surface. Preferably the membrane is made from polyurethane, polyvinyl alcohol, nylon, a polyolefin, a polyolefin/polyester, polyvinyl chloride or silicone rubber.

The membrane may be so flexible that, in use, it may tend to seal the gutter in the plastics layer and therefore impede the flow of air as it is withdrawn from the system. It is then desirable that means is used in the manner of a tent pole to prevent such sealing. The means should be sufficiently porous to allow passage of the air and one preferred solution is to lay spiral cable wrapping along the plastics gutter. This is a plastics material which is conventionally used to hold bundles of cable together. It is helical in shape and the gaps between the spirals permit passage of the air.

Because of the low pressures and temperatures involved in using the apparatus of the invention it may be constructed from light and inexpensive materials, such as glass fibre and plastics. The support may be made using, as a pattern, one of the preformed plastics shells prepared for use in the apparatus of the invention. The relatively thin plastics sheet may be supported if necessary and may be treated with a mould release agent. Glass fibre is then applied to the pattern and impregnated with polymerizable resin which is cured to make the support more substantial. The thickness of the support may be increased as desired by additional layers of glass fibre and resin. The edges of the support, so prepared, are then trimmed and attached to the base. Alternatively, a support may be used which is an integral part of the base. If desired, a vent may be provided between the shaped surface of the support and the atmosphere so that the reinforced plastics sheet can be removed easily from the support after the vacuum has been applied.

The seal around the edge of the support may be made from any suitable rubbery material such as neoprene. The seal may be attached to, adhered to or embedded in the apparatus. The seal may be made conveniently from split rubber hose and adhered directly to the edge of the apparatus. In one embodiment of the invention, additional seals are provided to prevent resin seeping under the plastics layer and corroding its lower, cosmetic surface. These seals may be located on or in the outer wall of the gutter and the adjacent surface of the support.

In use, the membrane may be held over the support and in contact with the peripheral seal by any suitable means, but it is preferred that the membrane is attached, such as by adhesive or tape, to a frame which is able to be fitted round the base. The frame fits slideably over the walls of the apparatus and rests on the rim thereof. The frame is preferably deep, so that it resists flexure in the vertical plane, but thin, so that it is able to flex in the horizontal plane. When the frame is in position and vacuum is applied tension in the membrane will then pull the frame against the peripheral seal and tend to lock it to the apparatus. The frame may, however, be mechanically attached to apparatus, particularly when the apparatus is large, such as by latches or clamps.

The plastics layer may be a preformed plastics shell or a gel coat. However, when a gel coat is used which is prepared by application directly to the surface of the support, that surface must be polished to provide an acceptably smooth and attractive surface on the final reinforced article. Since this involves more expensive tooling it is preferred that a plastics sheet is used as the plastics layer. Such a material has one or more of the following desirable characteristics: outdoor weatherability, impact resistance, capability of forming a chemical bond with the resin, ready availability in thin sheet form, attractive cosmetic qualities such as colour and texture, and ease of handling during processing.

The plastics sheet is preferably a thermoplastic polymer of at least one of: alkyl or aralkyl acrylates and/or methacrylates, vinyl chloride, acrylonitrile, methacrylonitrile, butadiene, styrene and substituted styrenes.

More preferably, the plastics sheet comprises a cured thermoplastic composition prepared from a monomer mixture comprising at least 50% by weight of at least one of alkyl acrylates, aralkyl acrylates, alkyl methacrylates, and aralkyl methacrylates. A sheet having this composition is also referred to as an acrylic sheet.

Most preferably, the plastics sheet comprises a cured thermoplastic composition prepared from a blend of (1) from 10% to 96% by weight of a rigid thermoplastic polymer comprising a homopolymer of a ($C_1$–$C_4$) alkyl methacrylate or a copolymer of at least 50% by weight of a ($C_1$–$C_4$) alkyl methacrylate and the balance, to total 100%, of at least one other copolymerizable monoethylenically unsaturated monomer; and (2) from 90% to 4% by weight of a multi-stage, sequentially-produced polymer characterized by:

(a) a non-elastomeric, relatively hard first stage having a Tg greater than 25° C., polymerized from a monomer mixture comprising 70% to 100% by weight of at least one of the monomers specifically mentioned above for the rigid thermoplastic polymer, 0% to 10% by weight of a copolymerizable polyfunctional cross-linking monomer, and 0.05 to 5.0% by weight of a copolymerizable graftlinking monomer;

(b) an intermediate elastomeric stage, polymerized in the presence of a product containing the first stage, from a monomer mixture comprising 50% to 99.9% by weight of a ($C_1$–$C_8$) alkyl acrylate or mixtures thereof, 0 to 49.9% by weight of a copolymerizable monoethylenically unsaturated monomer 0 to 5.0% by weight of a copolymerizable polyfunctional crosslinking monomer, and 0.05 to 5.0% by weight of a copolymerizable graftlinking monomer, the latter stage further characterized in that it would exhibit a Tg of 25° C. or less if the monomers were polymerized in the absence of the product containing the first stage; and (c) a final stage polymerized in the presence of a product containing said first and said intermediate stages from a monomer mixture comprising 70% to 100% by weight of at least one of the monomers specifically mentioned above for the rigid thermoplastic polymer, the final stage further characterized in that it would exhibit a Tg greater than 25° C. if the monomers were polymerized in the absence of the product containing the first and intermediate stages, said graftlinking monomer having two or more addition polymerizable unsaturated reactive groups which participate in the polymerization reaction at substantially different rates and said crosslinking monomer having a plurality of addition polymerizable unsaturated groups all of which participate in the polymerization reaction at about the same rate as one another.

The plastics sheet may be flat, to produce flat articles or, especially advantageously, the sheet may be thermoformed into any desired configuration for use in making articles having a particular configuration by the method of the invention. When the plastics layer comprises a gel coat, it is obtained and applied to a release agent-treated support by known methods.

Although the plastics layer in the product article may be of any desired thickness, it is preferably at least 0.030 inches thick, more preferably at least 0.040 inches thick.

When a thermoplastic sheet is used, it may be thermoformed to the desired configuration by known thermoforming techniques. Automatic or semi-automatic thermoforming equipment may be used so as to provide a thermoforming sequence which is fast enough to prevent premature cooling during the forming step and defects resulting therefrom, to provide greater consistency in the formed shells, to reduce labour costs, and to allow for larger-scale production. The heating source used may be any suitable heating oven or infrared heating device. The moulds used in thermoforming the thermoplastic sheet may be of cast aluminum or fibreglass/plastic composition. By using collapsible moulding devices, thermoplastic shells having undercut designs can be formed.

The fibrous reinforcement material which is used in this invention comprises at least one of continuous strand glass fibre, chopped strand glass fibre, nylons, carbon, boron, aramids, woven fabrics and mixtures thereof. Preferably, the fibrous reinforcement comprises continuous strand glass fibre and/or chopped strand glass fibre in mat form.

One or more layers of glass fibre may be used as the reinforcement. Preferably the fibre mesh is graded so that an open mesh is in immediate contact with the plastics layer and a closer mesh is on the surface of the reinforcement. This arrangement provides a desirable balance of resin distribution and permeability so that the resin can more easily reach and attack the plastics layer.

In a preferred embodiment the method of the invention and articles made thereby use preformed fibrous reinforcement shaped to the dished surface of the support. This reinforcement may comprise one or more layers of glass fibre mat having a glass content of from 90 to 99.9% by weight, the balance to total 100% by weight comprising a binder resin which holds the fibres together in the desired shape.

Thus at least one layer of glass fibre mat, for example a chopped strand fibreglass mat containing a sufficient amount of thermoplastic binder resin to hold the fibres in the desired shape is heated in an oven which is set at a temperature sufficiently high to soften the binder. When the binder becomes soft, the mat is positioned over a mould or support so that a pressure ring can be lowered onto, and restrict the motion of, the mat as it is forced into the shape of the surface of the support. The pressure used is to prevent stretching of the mat and bunching of its edges but sufficient to confer upon the mat the shape of the cavity. The resulting preformed glass fiber construction may then be used in the method of the invention.

The liquid plastics resin which is employed in this invention is preferably characterized by the following properties: (1) low viscosity; (2) moisture resistance; and (3) favourable wetting properties. The resin may be a polymerizable thermosettable liquid which is sufficiently reactive so as to allow complete polymerization in thin coatings but not so reactive that it exotherms excessively and distorts the thermoplastic shell. Suitable resins include (a) a polymerizable liquid thermosettable resin such as a polyester/styrene, crosslinking acrylic, epoxy, urethane, phenolic, melamine or silicone resin misture, and (b) a thermoplastic resin. When the resin is of class (a) above it further includes a polymerization catalyst to cure the resin. When the resin comprises a polyolefin such as, for example, molten polypropylene, hardening thereof is achieved by cooling to a temperature below the melting point of the resin. Thermoplastic resins such as polypropylene may be used for making articles having lower heat resistance than those prepared with thermosetting resins.

Preferably, the resin comprises a polyester/stryene or crosslinking acrylic resin. These resins do not undergo condensation reactions during polymerization and thereby permit low moulding pressures.

The acrylic resin preferably comprises at least 50% by weight of acrylic monomers, such as an alkyl or aralkyl ester of acrylic or methacrylic acid, and a crosslinking polyunsaturated monomer which is copolymerizable with the acrylic monomer such as alkylene diacrylates and dimethacrylates, and alkylene triacrylates and trimethacrylates, and polyvinyl aromatic compounds. Although polymerizable crosslinking acrylic resin mixtures have the advantages of being able to form chemical bonds with a great variety of thermoplastic materials and to polymerize in the presence of air and having suitably low viscosity, they suffer the disadvantage of being quite costly.

More preferably, the resin comprises a liquid polymerizable polyester/styrene mixture. As is known in the art, the polyester resin usually comprises the reaction product of at least one polymerizable ethylenically unsaturated polycarboxylic acid, such as maleic acid or its anhydride, and a polyhydric alcohol, such as propylene glycol and, optionally, one or more saturated polycarboxylic acids, such as phthalic acid or its anhydride. The resulting polyester base resin is then diluted with a liquid polymerizable monomer.

The polymerization of the thermosettable resin may be initiated by any of the means known in the art for generating free radicals. The polymerization catalyst system may be a self curing catalyst/accelerator system comprising as the catalyst, a peroxide such as benzoyl peroxide or pentanedione peroxide, and as the accelerator, a tertiary amine such as dimethyl—or diethylaniline or a polyvalent metal—containing complex or salt such as cobalt naphthenate. Alternatively, a photosensitive initiator such as benzoin or a benzoin ether, which reacts under radiant energy applied through the transparent plastic membrane, such as ultra violet or infra-red light waves, may be used in combination with a low temperature reactive peroxide such as peroxidicarbonate.

Fillers such as alumina trihydrate, can be used in this invention to increase the resin mixture volume, to reduce the amount of costly resin mixture required, and to impart fire resistance to the resulting article.

The reinforced plastics materials prepared by the method of the invention may be used in many applications. When the plastics layer is an acrylic sheet, particularly an impact-modified polymethacrylate, the plastics surface of the reinforced article is attractive, durable and tough. Examples of the uses of the reinforced materials include car bodies; panels and bodies in recreational vehicles, such as campers and caravans; boat hulls; in the construction of swimming pools and prefabricated structures, such as facing or roof panels and in containers for cargo handling, especially where foodstuffs are involved.

The plastics layer is correspondingly shaped to the flat or dished area of the support and similarly shaped to at least a part of the length of the gutter. Clearly, the close correspondence in shape between the layer and support is more important in the flat or dished area than in the gutter since the former provides the finished part.

The gutter in the support and/or the plastics layer may be continuous or discontinuous. When the gutter is discontinuous each section should have its own channel communicating with at least one outlet.

I claim:

1. A method of reinforcing a layer of plastics material by means of an apparatus comprising a base with a support thereon, which support has a dished surface having a female configuration when viewed from the top bounded at least in part by a gutter having at least one channel communicating with at least one outlet provided in the body of said support, said outlet connected to vacuum means and at least one seal bounding said gutter and outlet, the plastics material being correspondingly shaped to said surface and gutter, the method comprising the steps of:

(a) applying the layer of plastics material to the support,
   (b) applying at least one layer of fibrous reinforcement to at least the dished area of the plastics material,
   (c) applying a polymerizable resin to the fibrous reinforcement,
   (d) laying at least one flexible plastic membrane, correspondingly pre-shaped to the surface and having a male configuration when viewed from the bottom, over the support so as to overlap the seal,
   (e) drawing air from the outlet so as to form an at least partial vacuum between the membrane and the surface and to impregnate the reinforcement with the resin,
   (f) polymerizing the resin, or allowing it to polymerize, and resin surplus to that required to impregnate the fibrous reinforcement being received by the gutter in the plastics material, and
   (g) removing the flexible membrane from the resin impregnated reinforcement.

2. A method as claimed in claim 1 wherein the layer of plastics material comprises a preformed plastics sheet.

3. A method as claimed in claim 2 wherein the plastics sheet is a thermoplastic polymer of at least one of: alkyl or aralkyl acrylates and/or methacrylates, vinyl chloride, acrylonitrile, methacrylonitrile, butadiene, styrene and substituted styrenes.

4. A method as claimed in claim 3 wherein the plastics sheet comprises a cured thermoplastic composition prepared from a blend of (1) from 10% to 96% by weight of a rigid thermoplastic polymer comprising a homopolymer of a ($C_1$-$C_4$) alkyl methacrylate or a copolymer of at least 50% by weight of a ($C_1$-$C_4$) alkyl methacrylate and the balance, to total 100% of at least one other copolymerizable monoethylenically unsaturated monomer; and (2) from 90% to 4% by weight of a multi-stage, sequentially-produced polymer characterized by:

(a) a non-elastomeric, relatively hard first stage having a Tg greater than 25° C., polymerized from a monomer mixture comprising 70% to 100% by weight of at least one of the monomers specifically mentioned above for the rigid thermoplastic polymer, 0% to 10% by weight of a copolymerizable polyfunctional crosslinking monomer, and 0.05 to 5.0% by weight of a copolymerizable graftlinking monomer;
   (b) an intermediate elastomeric stage, polymerized in the presence of a product containing the first stage, from a monomer mixture comprising 50% to 99.9% by weight of a ($C_1$-$C_8$) alkyl acrylate or mixtures thereof, 0 to 49.9% by weight of a copolymerizable monoethylenically unsaturated monomer 0 to 5.0% by weight of a copolymerizable polyfunctional crosslinking monomer, and 0.05 to 5.0% by weight of a copolymerizable graftlinking monomer, the latter stage further characterized in that it would exhibit a Tg of 25° C. or less if the monomers were polymerized in the absence of the product containing the first stage; and (c) a final stage polymerized in the presence of a product containing said first and said intermediate stages from a monomer mixture comprising 70% to 100% by weight of at least one of the monomers specifically mentioned above for the rigid thermoplastic polymer, the final stage further characterized in that it would exhibit a Tg greater than 25° C. if the monomers were polymerized in the absence of the product containing the first and intermediate stages, said graftlinking monomer having two or more addition polymerizable unsaturated reactive groups which participate in the polymerization reaction at substantially different rates and said crosslinking monomer having a plurality of addition polymerizable unsaturated groups all of which participate in the polymerization reaction at about the same rate as one another.

5. A method as claimed in any of claims 1 to 4 wherein the fibrous reinforcement comprises glass fibre.

6. A method as claimed in claim 5 wherein the fibrous reinforcement is preformed and comprises one or more layers of glass fibre, the reinforcement having a glass content of from 90 to 99.9% by weight, the balance to total 100% by weight comprising a binder resin which holds the fibres together in the desired shape.

7. A method of claim 5 wherein the fibrous reinforcement comprises continuous and/or chopped strand glass fibre in mat form.

8. A method of claims 1 wherein the polymerizable resin comprises a polyester/styrene or crosslinking acrylic resin.

9. An apparatus wherein fibrous reinforcement may be applied to a layer of plastics material and bonded thereto by the polymerization of non-foamble resin distributed through the reinforcement, which apparatus comprises:
(i) a base bearing
(ii) a support having a dished surface and having a female configuration when viewed from the top bounded at least in part by a gutter having at least one channel communicating with at least one outlet provided in the body of said support, said outlet connected to vacuum means, the support accepting in use the layer of plastics material which has a shape corresponding to the surface and gutter, the gutter in the plastics material being for receiving any resin surplus to that required to impregnate the fibrous reinforcement,
(iii) at least one flexible plastics membrane positioned above said support on a moveable frame and correspondingly pre-shaped to the surface of said support and which, when laid over the support, will overlap said gutter and a seal (iv), said membrane having a male configuration when viewed from the bottom, and said membrane removed from the bonded fibrous reinforcement after each molding operation;
(v) at least one seal bounding the gutter and outlet of the support so that when air is drawn from the outlet an at least partial vacuum is formed between the membrane and the surface.

10. Apparatus as claimed in claim 9 wherein the dished surface is bounded by a continuous gutter.

11. Apparatus as claimed in claim 9 wherein the dished surface is bounded at least in part by discontinuous gutter.

12. Apparatus of claims 9 wherein the membrane is attached to a frame which is able to be fitted round the base.

13. Apparatus as claimed in any preceding claim wherein the membrane is a polyurethane, polyvinyl alcohol, nylon, polyolefin, polyolefin/polyester, polyvinyl chloride or silicone membrane.

14. Apparatus of claim 9 wherein the seal is located on or in the peripheral edge of the support.

15. Apparatus of claim 9 having at least one seal located on or in the outer wall of the gutter and the adjacent surface of the support.

* * * * *